US012447494B2

(12) United States Patent
Mezhericher et al.

(10) Patent No.: US 12,447,494 B2
(45) Date of Patent: Oct. 21, 2025

(54) HIGH-THROUGHPUT MONODISPERSE AEROSOLS OF MICRO-SHELL PARTICLES

(71) Applicant: The Trustees of Princeton University, Princeton, NJ (US)

(72) Inventors: Maksym Mezhericher, Princeton, NJ (US); Howard A. Stone, Princeton, NJ (US)

(73) Assignee: The Trustees of Princeton University, Princeton, NJ (US)

(*) Notice: Subject to any disclaimer, the term of this patent is extended or adjusted under 35 U.S.C. 154(b) by 750 days.

(21) Appl. No.: 17/778,135

(22) PCT Filed: Nov. 19, 2020

(86) PCT No.: PCT/US2020/061186
§ 371 (c)(1),
(2) Date: May 19, 2022

(87) PCT Pub. No.: WO2021/102085
PCT Pub. Date: May 27, 2021

(65) Prior Publication Data

US 2023/0028572 A1 Jan. 26, 2023

Related U.S. Application Data

(60) Provisional application No. 62/939,179, filed on Nov. 22, 2019.

(51) Int. Cl.
*B05B 17/04* (2006.01)
*B65D 83/28* (2006.01)

(52) U.S. Cl.
CPC .............. *B05B 17/04* (2013.01); *B65D 83/28* (2013.01)

(58) Field of Classification Search
CPC .............. B01F 23/2373; B01F 23/2375; B01F 23/291; B01F 25/721; B05B 17/04; B65D 83/28
See application file for complete search history.

(56) References Cited

U.S. PATENT DOCUMENTS 5,645,124 A 7/1997 Hartfield et al.
6,228,346 B1 5/2001 Zhang et al.
(Continued)

FOREIGN PATENT DOCUMENTS

FR 2301289 A1 * 9/1976
WO 9609846 A1 4/1996
(Continued)

OTHER PUBLICATIONS

English Abstract of FR 2301289 A1 (Year: 1976).*
(Continued)

*Primary Examiner* — Charles S Bushey
(74) *Attorney, Agent, or Firm* — Meagher Emanuel Laks Goldberg & Liao, LLP

(57) ABSTRACT

Disclosed herein is a simple method for generation of high-throughput aerosols of monodisperse micro-shell particles. To create the aerosol, small nozzles are employed blowing slightly compressed air on a thin liquid film. This allows one to generate bubble aerosols including particles having a thin liquid shell surrounding a gas core, which are suspended in a carrier gas flow or environment. The diameter of the created liquid shells is uniform and scales with the inner diameter of the blowing nozzle, enabling control on the size of the produced monodispersed aerosol and formation of particles between few microns to several hundred of microns in outer diameter.

20 Claims, 5 Drawing Sheets

(56) References Cited

U.S. PATENT DOCUMENTS

| | | | |
|---|---|---|---|
| 2002/0003312 | A1 | 1/2002 | Ganan-Calvo |
| 2008/0072895 | A1 | 3/2008 | Ganan-Calvo |
| 2009/0098168 | A1 | 4/2009 | Hettiarachchi et al. |

FOREIGN PATENT DOCUMENTS

| | | | |
|---|---|---|---|
| WO | 2013001309 | A2 | 1/2013 |
| WO | 2013001309 | A3 | 1/2013 |

OTHER PUBLICATIONS

Salkin, L.; Schmit, A.; Panizza, P.; Courbin, L., "Generating Soap Bubbles by Blowing on Soap Films", Phys. Rev. Lett 2016, 116, 077801.
Zhou, M.; Li, M.; Chen, Z.; Han, J.; Liu, D., "Formation of soap bubbles by gas jet" Appl. Phys. Lett 2017, 111, 241604.
Kim, I.; Mandre, S., "Marangoni elasticity of flowing soap films" Phys. Rev. Fluids 2017, 2, 082001.
Extended European Search Report for corresponding European patent application No. 20890742.8, dated Nov. 8, 2023.
International Search Report and Written Opinion for corresponding PCT Application No. PCT/US2020/061186, dated Feb. 10, 2021.

* cited by examiner

HIGH-THROUGHPUT MONODISPERSE AEROSOLS OF MICRO-SHELL PARTICLES

CROSS-REFERENCE TO RELATED APPLICATIONS

This application claims priority to U.S. Provisional Patent Application No. 62/939,179, filed Nov. 22, 2019, which is hereby incorporated in its entirety by reference.

TECHNICAL FIELD

The present invention relates generally to the generation of aerosol particles, and specifically to methods and systems for high throughput generation of aerosols with stable, monodispersed, submillimeter-sized micro-shell particles using gas jets and falling films.

BACKGROUND

Aerosols are useful in many industries, including medical, pharmaceutical, and food industries. In the medical field, aerosols can be useful for the delivery of therapeutic or diagnostic agents, as they avoid problems associated with other delivery methods such as oral administration (acidic environment of body/stomach, the ability of the agent to pass through the walls of the intestines, the liver's metabolizing of the agents, etc.) or injection (pain, risk of infection, hazardous waste generation, etc.). Aerosols can deliver an agent directly to a target area, such as the eye, or the nasal or respiratory tract. The latter can be an efficient way of direct delivering drugs to treat COVID-19 patients.

There are multiple types of aerosols, including, e.g., liquid droplets, as well as what are called bubble aerosols. Bubble aerosols consist of liquid particles having a thin liquid shell surrounding a gas core, which are suspended in a carrier gas flow or environment.

In order for droplet aerosols to be useful in biomedical applications, however, either the aerosols must be generated at the point of use, or they must have long-term stability. The two types of currently functional aerosols include aerosols of liquid droplets, generated by nebulizers and metered-dose inhalers, and aerosols of dry particles, which are separately produced and loaded into dry powder inhalers. Both nebulizers and metered-dose inhalers are point of use devices that create aerosols of liquid droplets by forcing a liquid suspension through an orifice to generate an aerosol. Neither has long-term stability-both generate aerosols that need to last seconds, at most. Additional disadvantages of those devices include generation of polydisperse droplet size distributions, low particle deposition in the lower airways of the human respiratory system, and the difference in the concentration of a therapeutic agent between delivered droplets compared to an initial solution, which all pose risks of insufficient or excessive medicine delivery. And neither of those two devices can generate aerosols of uniform-diameter particles, as well as liquid micro-shells (aerosol bubbles), which can be used as drug carriers and instantly solidified by either solvent evaporation, freezing or a chemical reaction. In addition, none of the current devices generating aerosols of droplets has additional functionality of formation of fine monodisperse liquid or solid foams simply by collecting liquid micro-shells from the generated aerosol on a surface or in a vessel, while the liquid walls of particles of adhere to each other and then can solidify due to solvent evaporation, freezing or polymerization.

Therefore, a system and method for generating stable aerosols of uniform-diameter liquid micro-shells are useful and desirable.

BRIEF SUMMARY

A first aspect of the present disclosure is a system for generating monodisperse bubble aerosols, consisting of uniform-diameter submillimeter-diameter particles having a thin liquid shell surrounding a gas core. The system includes a frame configured to create a falling film having a thickness less than 20 μm, where the falling film has a first end (a top), a second end (a bottom), and an intermediate portion. The system also includes a small nozzle configured to direct a gas towards the intermediate portion of the falling film, preferably in a direction perpendicular to a surface of the falling film, and a controller that is adapted to control the pressure of the gas provided to the nozzle, the pressure being between 10 and 1500 mbar.

The system may contain a pump configured to provide a liquid to the top portion of the falling film at a controlled rate, a camera directed at the intermediate portion, and/or a container to collect the liquid from the bottom of the falling film. The liquid used to form the falling film may optionally have a viscosity less than 100 mPa·s at 25° C., and may optionally contain an additional material that is suspended or dissolved in the liquid, such as an active pharmaceutical ingredient (API). The supplied gas directed into the nozzle may optionally contain suspended micron- or nano-sized particles or droplets, which may comprise an API. The nozzle may optionally have an inner diameter of less than 1 mm, or less than 1 μm. Optionally, the system may utilize a bank of nozzles blowing in parallel on one or more falling films. Optionally, a carrier gas is supplied to dilute or direct the flow of the generated bubble aerosol. The system preferably creates monodisperse aerosol bubbles, which are uniform-diameter particles having a thin liquid shell surrounding a gas core. Thus, aerosols of bubbles are essentially aerosols of liquid micro-shells, and those two terms are used interchangeably through this text. Optionally, the generated liquid shells may have an average outer diameter (or a maximum outer diameter) less than 1 mm. Optionally, the produced liquid shells may have a wall thickness of less than 5 μm. Optionally, the film is created by either pumping a liquid containing small amount of surfactant to the top of a vertically-oriented frame and allowing the liquid to create the film as it falls, or periodically dipping the frame into a liquid containing surfactant. Optionally, the system includes a second falling film, and optionally the aerosol bubbles that are formed from the first falling film then pass through the second falling film. This process optionally creates a multilayer shell structure, around the central core, which initially comprises the gas.

A second aspect of the present disclosure is drawn to a method for generating bubble aerosols, which preferably relies on the system described previously. The method involves creating a falling film from a liquid containing a dissolved surfactant, the falling film having a thickness of less than 20 μm; and then generating a plurality of liquid micro-shell particles by providing a gas at a pressure of between 10 and 1500 mbar to a nozzle configured to direct the gas through the falling film. The method may optionally include solidification of aerosol bubbles, by either solvent evaporation, freezing or chemical reaction like polymerization, collecting the plurality of aerosol bubbles, and/or generating a solid foam material from the plurality of aerosol bubbles. Optionally, the method involves generating between 1500 and 5000 uniform-diameter liquid micro-shells per second per nozzle.

DETAILED DESCRIPTION

The present invention is drawn to a system and method for creating stable, monodisperse aerosol of micro-shell particles, the aerosols comprising particles having liquid shell of micron-scale thickness surrounding a gas core (sometimes referred to herein as "aerosol bubbles").

As used herein, "monodisperse" refers to particles having substantially uniform outer dimensions. In some embodiments, the polydispersity index (PI), a measure of the heterogeneity of a sample based on size, is used to reflect the dispersity of the particles. Assuming a gaussian distribution of particle sizes, the PI is generally understood as the square of (standard deviation/mean diameter of the particles). The PI can be obtained from instruments that use dynamic light scattering (DLS) or determined from electron micrographs. International standards organizations (ISOs) have established that PI values<0.05 (5%) indicate a highly monodisperse sample, while values>0.7 (70%) indicate a broad distribution (e.g., polydisperse) of particle sizes (ISO standards ISO 22,412:2017 and ISO 22,412:2017). PI values<0.1 (10%) are generally understood as being monodisperse. As such, in preferred embodiments, the monodisperse particles have PI values<0.05, <0.04, <0.03, <0.02, or <0.01.

Figure 1:
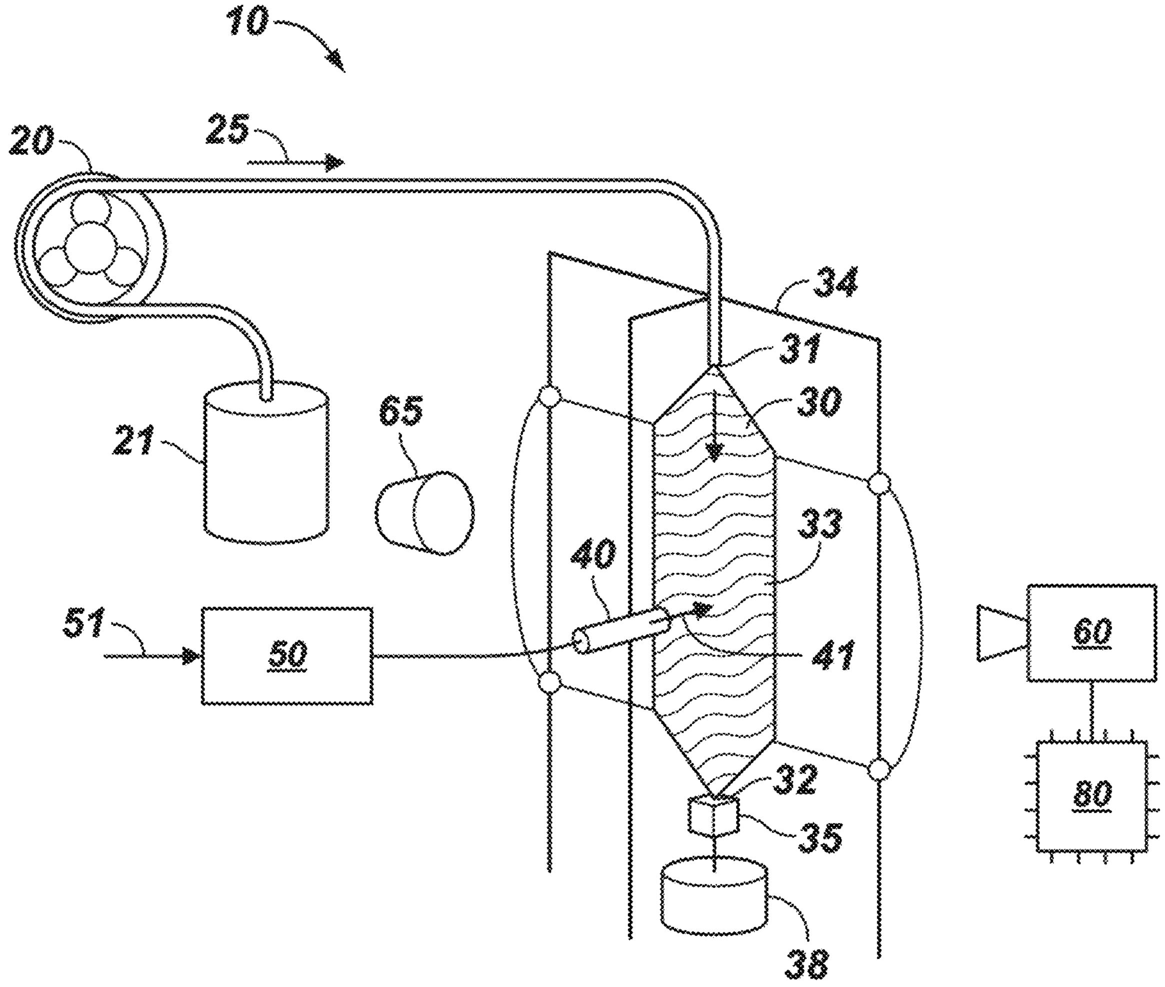
FIG. 1 is a depiction of an embodiment of the disclosed system.

The system can best be understood referring to FIGS. 1-4. As can be seen in FIG. 1, the system 10 can generally be described as requiring a nozzle 40 to be positioned so as to direct a stream 41 of a gas toward and through a falling film 30, in order to form aerosol bubbles.

Nozzle

The nozzle 40 is shown in FIG. 1 as being a single nozzle. However, the system may contain multiple nozzles, each of which can be configured and controlled independently. In some embodiments, a plurality of nozzles, which may be a bank of nozzles (nozzles that are connected and/or otherwise set at a fixed distance from each other), can be directed towards a falling film 30. For example, referring to FIG. 2, the system 11 may contain two nozzles 40, 44 spaced apart, the end of the first nozzle 40 has a first inner diameter 42 and the end of the second nozzle 44 has a second inner diameter 46. Note that the inner diameter should be measured on the end 48 closest to a first surface 36 of the falling film 30. The inner diameters of each nozzle may be the same, or may be different, depending on the aerosol bubble output desired. The ends of each nozzle are spaced a distance 43, 47 from the falling film 30, and are oriented to direct a stream of gas 41, 45 towards and through the falling film 30. The first nozzle 40 forms a first stream of monodisperse aerosol bubbles 70, 71. The second nozzle 44 forms a second stream of monodisperse aerosol bubbles 72, 73. These streams of aerosol bubbles may have identical or different mean particle sizes. In preferred embodiments, each stream of aerosol bubbles has a mean particle size deviating within 10% difference of all other streams of aerosol bubbles.

Figure 2:
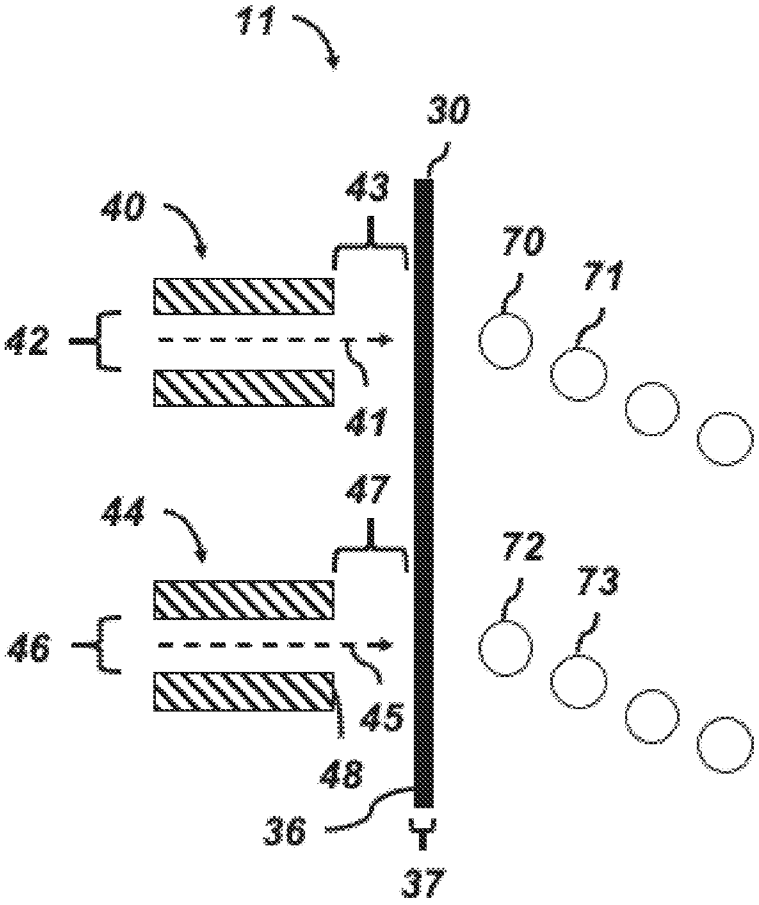
FIG. 2 is a cross-section of an alternate embodiment of a portion of the disclosed system, focusing on the nozzles, falling film, and formed aerosol bubbles.

Referring to FIG. 2, the nozzles 40, 44 in any system can theoretically have almost any inner diameter 42, 46. Without adjusting any other characteristic of the system, the mean diameter of the formed aerosol bubbles will generally vary linearly with the inner diameter of the nozzle. To form submillimeter aerosol bubbles, the inner diameter of the nozzle should preferably be less than 1 mm. To form aerosol bubbles with diameter near or below one micrometer, the inner diameter of the nozzle should preferably be less than 1 μm. To form nanoparticles, the inner diameter of the nozzle should preferably be less than 100 nm.

Referring to FIG. 2, typically, as the inner diameter 42, 46 is reduced, the smaller the space or distance 43, 47 there should be between the end of the nozzle 40, 44 and the falling film 30. In one example, glass nozzles with an inner diameter of between 0.1 and 0.5 μm (100 to 500 nm), were placed with the ends of the nozzle within 1-5 μm from the falling film, while nozzles with an inner diameter of about 0.1 mm (100 μm) was placed approximately 0.9-1.5 mm from the film. In some embodiments, the space between the ends of the nozzle and the film is between 5 and 20 times the inner diameter, although the distances will vary based on pressure and film characteristics (e.g., film thickness for a given liquid composition).

The nozzles utilized in the disclosed systems preferably have a circular cross-section, and the end of each nozzle is preferably a flat surface perpendicular to the direction the gas is flowing through the nozzle. Preferably the nozzles do not contain a bevel, such as those seen on regular hypodermic needles.

The nozzles may be of almost any material. For example, in some embodiments, the walls defining a nozzle are comprised of a metal (such as stainless steel, platinum, etc.) or a glass (such as a silicon dioxide glass).

In some embodiments, the nozzles 40 may be attached to a frame 34, positioned on one side of the falling film 30. In other embodiments, the nozzle is not attached to the frame 34. In some embodiments, the nozzles are in a fixed position and fixed orientation, while in others, the nozzles may vary in position, orientation, or both. For example, in some embodiments, a nozzle can be connected to spatial positioners driven by motors which control the location of a given nozzle's 2-D location (in a plane parallel to the film), and/or spatial positioners driven by motors which control the orientation of a given nozzle with respect to the film. In preferred embodiments, each nozzle 40, 44 is oriented such that the stream 41, 45 is oriented 90° (normal/perpendicular) to a first surface 36 of the falling film 30. In other embodiments, one or more streams 41, 45 deviates from normal to the first surface 36 by ≤5°, ≤10°, ≤15°, ≤20°, ≤25°, ≤30°, ≤35°, ≤40°, or ≤45° in any direction. Said differently, while the nozzles preferably direct a gas perpendicular to the surface of the film, it may sometimes be advantageous for the nozzles to direct the gas at a slight or moderate angle relative to the surface of the film.

Gas

The nozzle 40 is preferably connected to a flow control unit 50, such as a microfluidic flow control unit, that controls the flow of a gas from a source 51 to the nozzle 40. Flow control units are well known in the art and are commercially available in a variety of configurations. The flow control unit 50 is preferably adapted to control the pressure of the gas provided to each nozzle 40.

Skilled artisans will recognize that, to form aerosol bubbles, the pressure of the gas being provided to nozzle 40 is at least partially dependent on the characteristics of the falling film and the liquid used to form the falling film 30. For example, a thin film will require less pressure than a thicker film, and a liquid's viscosity and surface tension will also impact how much pressure is required. In some embodiments, the pressure exiting the flow control unit 50 is ≥10 mbar, ≥20 mbar, ≥30 mbar, ≥40 mbar, ≥50 mbar, or ≥100 mbar, and is ≤1500 mbar, ≤1250 mbar, ≤1000 mbar, ≤800 mbar, or ≤600 mbar, and all combinations thereof. In some embodiments, the pressure p is 10 mbar≤p≤1500 mbar, while in other embodiments, 50 mbar≤p≤1000 mbar, and in still other embodiments, 100≤p≤800 mbar.

Figure 4:
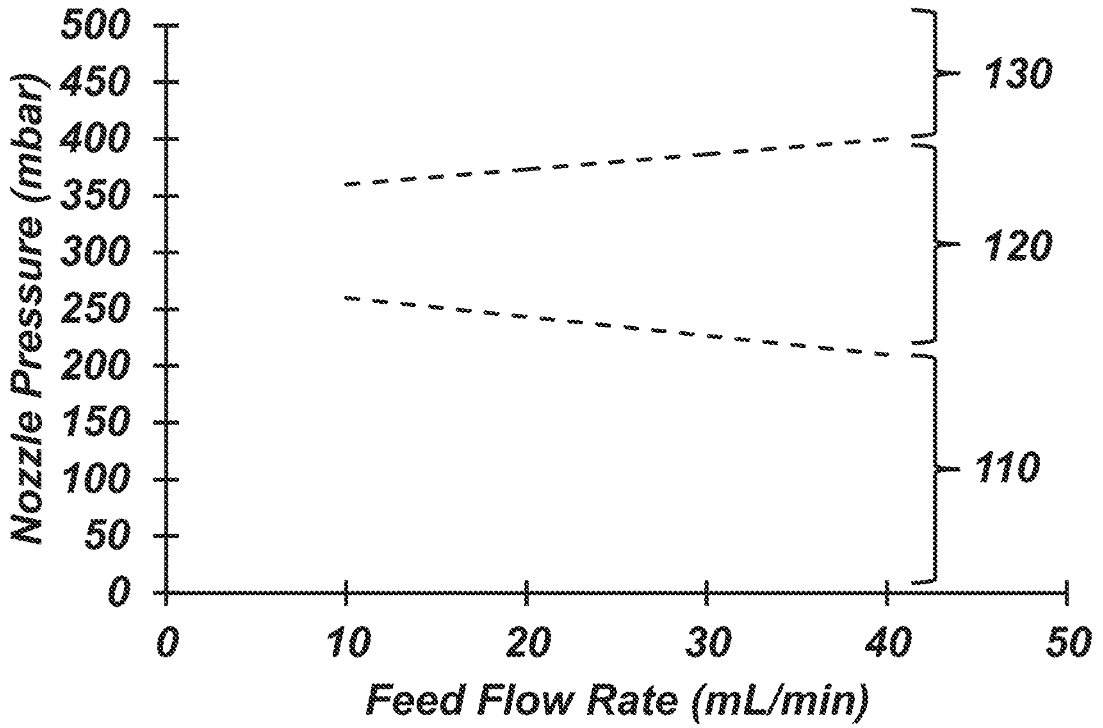
FIG. 4 is a graph, illustrating the relationship between the nozzle pressures, flow rates for forming the film, and the operating regimes of the system.

Referring briefly to FIG. 4, a graph showing an example of how the nozzle pressure and the flow rate for the liquid forming the falling film (i.e., the feed flow rate) impact the formation of bubble aerosols. In this specific example, the gas was compressed air, the nozzle had a diameter of 110 μm, and the liquid was 1.5% by volume of dish soap in water. As can be seen, when the pressure is low, the formation process falls into a first regime 110. In the first regime 110, a cavity is formed in the liquid film, but no aerosol bubbles are formed. As the pressure increases, eventually the system reaches a second regime 120, and high-throughput formation of uniform-diameter aerosol bubbles (aerosol particles having liquid micro-shell surrounding a gas core) occurs. This is the regime this present invention is intended to utilize. If pressure is increased still further, the system can reach a third regime 130, where liquid film bursting due to overpressure occurs. In this regime, aerosol bubbles do not form, and instead, the liquid film is ruptured locally.

The gas that is used to create the aerosol bubble can include any gas or gas mixture and may also include a liquid or solid micro/nano-size particles suspended in the supplied gas or gas mixture. Typically, the gas or gas mixture will comprise a carrier gas that does not substantially react with other components in the system. This gas or gas mixture may comprise, e.g., air, $CO_2$, $N_2$, or $O_2$, or noble gases like He, Ar, and the gas or gas mixture may or may not have been passed through filters prior to being used by the system.

In some embodiments, if the gas contains suspended micron- or nano-sized particles or droplets, the suspended particles or droplets comprise an active pharmaceutical ingredient (API), or biopharmaceutical materials, such as proteins or engineered microorganisms, etc. Other suspended materials or droplets may comprise a catalyst, food, or cosmetic ingredient, etc. For example, droplets can be used to encapsulate an active sunscreen ingredient, such as octocrylene, avobenzone, etc., and that encapsulated material can then be used in a sunscreen formulation.

In some embodiments, the suspended micron- or nano-sized particles or droplets are introduced to the gas or gas mixture prior to the flow control unit 50. In some embodiments, the suspended particles or droplets are introduced into the gas stream after the flow control unit 50. In some cases, this particles or droplets are metered into the gas through a Y-type connection.

In some embodiments, a carrier gas is supplied to dilute or direct the flow of the generated aerosol of micro-shell particles. Such carrier gas can be supplied either as a bulk environmental flow to which all the system shown in FIG. 1 is exposed, or a local flow supplied after thin film 30 to dilute or guide the flow of generated micro-shell particles. In some embodiments, the carrier gas supplied after thin film 30 can be hot dry air to promote rapid solvent evaporation from the generated liquid micro-shells and their conversion into solid micro-shells. In some embodiments, the carrier gas can be moist air with 100% relative humidity supplied to prevent evaporation of solvent from the generated liquid micro-shells and promote their transportation to long distances. In some embodiments, the carrier gas can be saturated vapor of nitrogen or saturated vapor of carbon dioxide, which is supplied to solidify the generated liquid micro-shells by freezing them. In some embodiments, the carrier gas can be a monomer vapor, which is combined with a catalyst or an oxidant included in the micro-shells to promote chemical reaction of gas phase polymerization. In some embodiments, the carrier gas can be a catalyst gas, which is combined with a monomer included in the micro-shells to promote chemical reaction of polymerization.

In some embodiments, the gas may comprise non-pharmaceutical and non-medicinal agents, such as scent agents. In some embodiments, the gas comprises such scent agents in order to be used to encapsulate a desirable or masking scent (such as a fragrance). That is, in some embodiments, the process results in a plurality of aerosol bubbles encapsulating a fragrance, where the fragrance would generally not be released until the outer shell was dissolved, popped, etc. In some embodiments, the desirable scent is not an aesthetically pleasing scent; that is, in some embodiments, the scent agent is a malodorant.

Falling Film

The falling film 30 is typically formed on a frame 34, that uses, e.g., wires, to hold and provide an area for the film to form. A liquid 21 (including, e.g., as a pure liquid, a solution, an emulsion, or a liquid containing suspended particles) passes to a pump 20, which controls the rate of the liquid 21 flowing to the falling film 30. The falling film 30 generally has a top portion 31, a bottom portion 32, and an intermediate portion 33. The liquid 21 is pumped to the top portion 31. Gravity causes the film to fall from the top portion 31 towards the bottom portion 32, typically conforming to a shape defined by wires connected to the frame 34. In some embodiments, a tensioning weight 35 is attached to the wires near the bottom portion 32, to aid in maintaining a uniform falling film. The liquid 21, after passing through the falling film 30 from the top portion 31 to the bottom portion 32, then typically drains into a collection device 38, which is typically an appropriately-sized container (e.g., a beaker, a drum, etc.) or funnel. In some cases, the liquid 21 from the collection device 38 is recycled, pumped back to the top portion 31 of the falling film 30. In some cases, the recycling is done in-line, and the collected liquid is then pumped back to the top portion 31 of the falling film 30.

The falling film as shown in FIG. 1 has a roughly hexagonal shape—the top portion 31 expands from a near-point at the top of falling film 30 to a predefined width. It is in this top portion that the film converts from a stream in, e.g., a connecting tube or pipe, becoming the desired thin film. The intermediate portion 33 then has a length at which it falls at that predefined width. It is in this intermediate portion that the film is the most uniform. The bottom portion 32 is the inverse of the top portion 31, reducing from the predefined width to a near-point at the bottom of the falling film 30.

In some embodiments, the film is initially generated using a relatively slow flow rate, and after the entire film is generated, the flow rate is increased until the desired film thickness is achieved.

Figure 5:
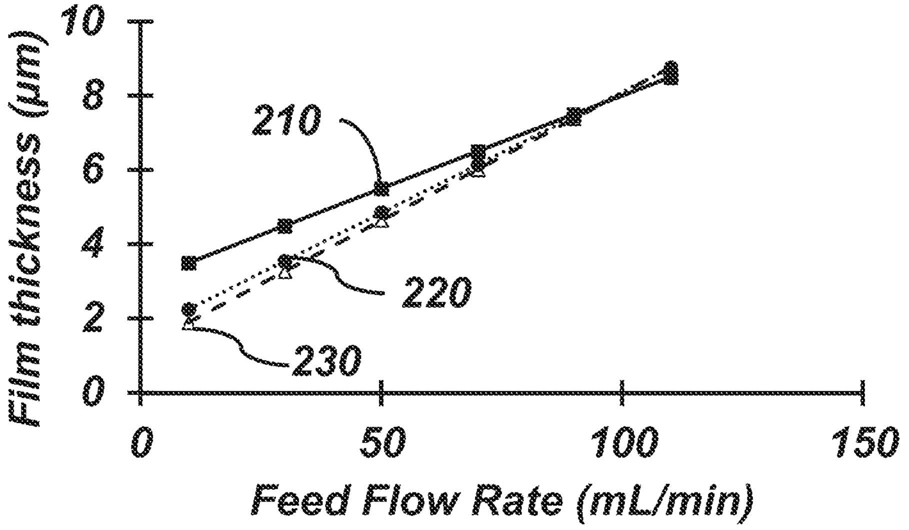
FIG. 5 is a graph, illustrating the relationship between the feed flow rate and the film thickness, and specifically the relationship for three different water and dish soap mixtures.

Generally, the flow rate of the liquid can be used to control the thickness of the falling film. As seen in, e.g., FIG. 5, for three different combinations of water and dish soap, the thickness of the films increases in a substantially linear manner as the flow rate increased from about 10 mL/min to about 110 mL/min. The three different compositions included 0.5% v/v dish soap 210, 1.5% v/v dish soap 220, and 3.0% v/v dish soap 230 dissolved in water. The 0.5% v/v dish soap 210 forms a slightly thicker film at lower flow rates, but was slightly less thick than the other compositions at 110 mL/min (about 8.5 μm vs about 8.75 μm). The 1.5% v/v dish soap 220, and 3.0% v/v dish soap 230 compositions both performed in similar manners, with the 1.5% v/v dish soap 220 forming a very slightly thicker film at lower flow rates.

While the minimum and maximum film thickness of a falling liquid that still allows for aerosol bubble formation will depend on the liquid's composition, films that can form aerosol bubbles will typically have a thickness of less than about 20 μm. In some embodiments, the thickness of the film is ≤20 μm, ≤18 μm, ≤16 μm, ≤14 μm, ≤12 μm, or ≤10 μm, and is ≥1 μm, ≥3 μm, ≥5 μm, or ≥10 μm, and all combinations thereof.

The wall thickness of the aerosol bubbles that are formed is at least partially based on the thickness of the falling film. As the film thickness increases, the wall thickness will also generally increase.

Additionally, as will be understood by those of skill in the art, the wall thickness is bound by the diameter of the aerosol bubble. It is physically impossible for a bubble with a 1 μm outer diameter to have 1 μm thick walls, for example. In some embodiments, the thickness of the walls is less than 20%, less than 10%, or less than 5% of the outer diameter of the bubble.

The composition of the liquid can vary, depending on the desired purpose of the aerosol bubble coating to be formed. The liquid will be a liquid. In some embodiments, the liquid comprises water and other water-soluble ingredients, such as alcohols (e.g., ethanol, etc.) or polyols (e.g., glycerol, etc.). In some embodiments, the liquid is non-aqueous. In some embodiments, the liquid is a solution. In some embodiments, the liquid is an emulsion. In some embodiments, the liquid contains an additional material that is suspended or dissolved in the liquid, such as an active pharmaceutical ingredient (API) or catalyst or monomer or oxidant. In some embodiments, the liquid also comprises a surfactant. The surfactants may be, e.g., pharmaceutically acceptable surfactants, including, e.g., non-ionic surfactants. In some embodiments, the surfactant has an HLB (hydrophilic lipophilic balance) value of from about 4 to about 10, preferably from about 7 to about 9. Surfactants having an HLB value of from about 4 to about 10 suitable for use in the present invention include for example, but are not limited thereto: polyoxyethylene alkyl ethers, e.g. polyoxyethylene (3) lauryl ether, polyoxyethylene (5) cetyl ether, polyoxyethylene (2) stearyl ether, polyoxyethylene (5) stearyl ether; polyoxyethylene alkylaryl ethers, e.g. polyoxyethylene (2) nonylphenyl ether, polyoxyethylene (3) nonylphenyl ether, polyoxyethylene (4) nonylphenyl ether, polyoxyethylene (3) octylphenyl ether; polyethylene glycol fatty acid esters, e.g. PEG-200 monolaurate, PEG-200 dilaurate, PEG-300 dilaurate, PEG-400 dilaurate, PEG-300 distearate, PEG-300 dioleate; alkylene glycol fatty acid mono esters, e.g. propylene glycol monolaurate (Lauroglycol®); sucrose fatty acid esters, e.g. sucrose monostearate, sucrose distearate, sucrose monolaurate, sucrose dilaurate; or sorbitan fatty acid mono esters such as sorbitan mono laurate (Span® 20), sorbitan monooleate, sorbitan monopalmitate (Span® 40), or sorbitan stearate, or mixtures of one or more thereof.

In some embodiments, the liquid includes other components, such as solvents, solubilizing agents, waxes, colorants, plasticizers, hydrophobic polymers, or hydrophilic polymers. A simple example is a liquid comprising water, 0.1-10% of a surfactant, and 0.1-5% of a hydrophilic polymer (such as polyethylenimine (PEI)).

The nozzles in the system are preferably directed towards the intermediate portion 33 of the falling film 30, avoiding any thickness or velocity gradients near the edges that might negatively impact uniformity. The length and width dimensions of the intermediate portion 33 can vary significantly. In some cases, the length of intermediate portion 33 is ≤200 cm, ≤150 cm, ≤100 cm, ≤50 cm, ≤25 cm, ≤10 cm, or ≤5 cm. In some cases, the width of intermediate portion 33 is less than ≤20 cm, ≤10 cm, ≤8 cm, or ≤5 cm, or ≤1 cm, or ≤0.5 cm In some embodiments, the overall length of the falling film 30 is ≤250 cm, ≤200 cm, ≤150 cm, ≤100 cm, ≤50 cm, ≤ 25 cm, or ≤10 cm, or ≤5 cm, or ≤1 cm.

In some embodiments, the nozzles are directed towards the center of the intermediate portion 33 of the falling film 30, ±25% of the width and/or length. That is, if the film is 8 cm wide and 20 cm long, the nozzles are generally directed at a portion of the film that is 4 cm from the left side of the intermediate portion 33, ±2 cm, and 10 cm from the top of the intermediate portion 33, ±5 cm. In some embodiments, all nozzles are within this centralized target range. In some embodiments, only some of the nozzles are within this centralized target range.

Figure 3A:
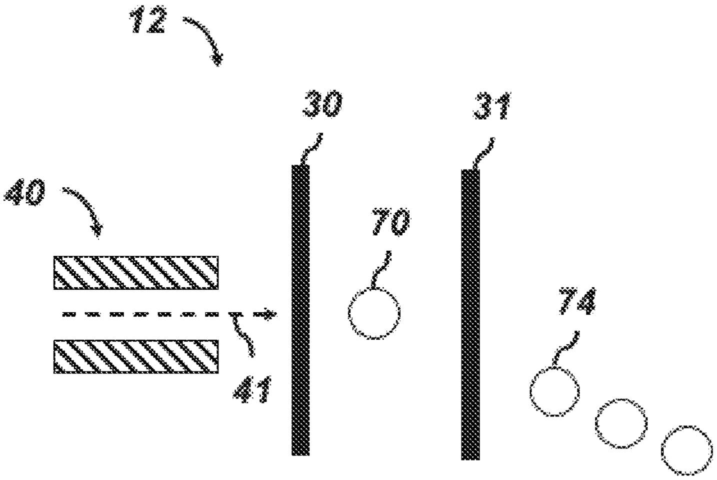
FIG. 3A is a cross-section of an alternate embodiment of a portion of the disclosed system, focusing on a nozzle, falling films, and formed aerosol bubbles.

The system in FIGS. 1 and 2 show an aerosol bubble being formed using a single falling film 30. However, as seen in FIG. 3A, in some embodiments, a system 12 can include multiple falling films 30, 31. In FIG. 3A, the nozzle 40 directs a stream 41 of a gas towards a first falling film 30. The aerosol bubble 70 that forms from the air passing through the first film is driven away from the first film 30 towards a second falling film 31. The momentum of the aerosol bubble 70 drives the aerosol bubble through the second falling film 31, resulting in a stream of aerosol bubbles 74. The stream of aerosol bubbles 74 may then pass through additional falling films (not shown). The number of falling films the aerosol bubbles 74 can pass through are limited only by the ability of the aerosol bubble to pass through a given film, which is driven, in part, by the velocity of the aerosol bubbles, thickness of the film and the viscosity and/or surface tensions of the film.

In preferred embodiments, the liquid of each falling film will have a viscosity≤500 mPa·s, ≤250 mPa·s, ≤200 mPa·s, ≤150 mPa·s, or ≤100 mPa·s, at 25° C.

In preferred embodiments, the liquid of each falling film will have a surface tension≤100 mN/m, ≤75 mN/m, ≤50 mN/m, ≤40 mN/m, or ≤30 mN/m.

Figure 3B:
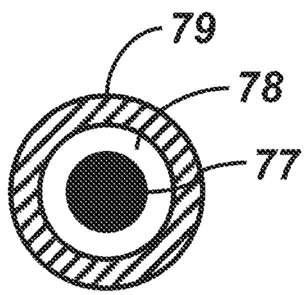
FIG. 3B is a cross-section of a core-shell construction of formed aerosol bubbles.

Because each falling film 30, 31 may have different compositions, this allows a skilled artisan to create a layered aerosol bubble structure, or a core-shell particle. Referring briefly to FIG. 3B, each aerosol bubble or core-shell particle can, for example, contain a core 77 that initially comprises the stream 41 of gas being directed at the first falling film 30. The first shell 78 of the particle initially comprises the first falling film 30. If no other falling films are utilized, that is the structure of the aerosol bubbles. However, if other falling films are utilized in the system, the second shell 79 of the particle would initially comprise the second falling film 31. Additional falling films (not shown) would add additional layers as desired. Skilled artisans will recognize that the volatile materials will eventually leave the aerosol bubble, so the starting compositions will not match the final composition of the aerosol bubble.

The use of multiple films also allows the creation of unique particle configurations. In some embodiments, one layer forms a hydrophobic shell, while another layer forms a hydrophilic shell, which can remain "wet" or can be dried. In some embodiments, a first layer uses a polymer material that can be quickly solidified (e.g., by drying, photopolymerization, etc.) to form a solid shell, and then the second falling film the second layer can remain "wet" or can be dried as well. This process can be repeated as long as the aerosol bubble/shell still have enough inertia to pass through a film. So the aerosol bubbles that are created can be a hollow dry multi-layer particle, and inside the central void of such particle there could be a gas and liquid/dry nanoparticles of a useful material, like medical drug, catalyst, food, or cosmetic ingredient, etc.

In preferred embodiments, all aerosol bubbles (shells with thin liquid walls and gas core) that are generated are monodisperse with respect to all other aerosol bubbles generated by all nozzles. In some embodiments, all aerosol bubbles that are generated from each nozzle is monodisperse with respect to the aerosol bubbles generated from that nozzle.

In some embodiments, the diameter (D) of the aerosol bubbles scales with the inner diameter (ID) of the nozzle, such as D=x ID, where generally 1<x<10. In some embodiments, 2<x<4. For example, with an approximately 110 μm inner diameter nozzle, aerosol bubbles were created that had bubble diameters of around 300 μm. In other examples using the same nozzle, the bubble diameters could be varied from between 300 and 800 μm, depending on various flow and liquid conditions.

In some embodiments, the generated aerosol bubbles have an average diameter ($D_{avg}$)<1 mm, <750 μm, <500 μm, <250 μm, or <100 μm. In some embodiments, the generated aerosol bubbles have a maximum diameter ($D_{max}$)<1 mm, <750 μm, <500 μm, <250 μm, or <100 μm, or <50 μm, or <20 μm, or <10 μm, or <5 μm, or <1 μm.

In preferred embodiments, the thickness of each shell or wall of the produced aerosol bubbles is ≤5 μm, ≤4 μm, or ≤3 μm, or ≤2.5 μm, and ≥0.5 μm, ≥1 μm, ≥1.25 μm, or ≥1.5 μm, and any combination thereof. In preferred embodiments, the average thickness of each shell or wall of the produced aerosol bubbles is 0.5 μm±0.12 μm, 1 μm±0.25 μm, 2 μm±0.25 μm, 3 μm±0.25 μm. These thin walls can enable rapid evaporation of solvents in the bubble walls.

Because of the small diameters and relatively thin walls, each aerosol bubble particle is very light, generally weighing ≤20 μg, ≤15 μg, ≤10 μg, or ≤5 μg, or ≤1 μg. This can enable precise delivery of materials, as very small payloads can be directed to a target location.

The throughput of the produced aerosol bubbles can vary dramatically. For example, in some experiments, the particle throughput was 1500-3500 aerosol bubbles per second, which translates to 10-30 mg/s. In some embodiments, the particle throughput was 1500-5000 aerosol bubbles per second per nozzle.

Given that thousands of aerosol bubbles can be generated quickly, these streams of bubbles can be collected (e.g., in a container, on a surface, etc.) and/or manipulated as desired.

In some instances, the aerosol bubbles are further dried and/or solidified, which may occur while the aerosol bubbles are in flight. In one example, a gas blowing on the film contains suspended micron/nano particles in it; these particles are then encapsulated by the aerosol bubble walls, which can solidify or not (depending on the solvent system, etc.) during their flight.

Alternatively, in some examples, polymers in a shell of the particles are cross-linked by exposed the aerosol bubbles to ultraviolet (UV) light. In some examples, the collected aerosol bubbles adhere to each other, and polymerize on the surface of the container or substrate that they were collected on. In some embodiments, the carrier gas can be saturated vapor of nitrogen or saturated vapor of carbon dioxide, which is supplied to solidify the generated liquid micro-shells by freezing them. In some embodiments, the carrier gas can be a monomer vapor, which is combined with a catalyst or an oxidant included in the micro-shells to promote chemical reaction of gas phase polymerization. In some embodiments, the carrier gas can be a catalyst gas, which is combined with a monomer included in the micro-shells to promote chemical reaction of polymerization.

In some embodiments, the process of collecting the aerosol bubbles results in a foam being generated on a surface or in a container (the bubbles will generally adhere to each other to create a foam with monodispersed gas bubbles), and the foam can remain liquid or solidify depending on the solvent in a falling film, and/or the drying and/or solidification process.

Bubbles in aerosol can also be used as transport agents for material delivery. That is, in some embodiments, the aerosol bubbles are configured to pop or dissolve when exposed to certain environments, which then release any materials contained within.

Additionally, while in preferred embodiments, the film is created by pumping the fluid (such as a liquid comprising a surfactant) to the top of a vertically-oriented frame and allowing the liquid to create the film as it falls, alternative approaches can be used. For example, in some cases, the film is created by periodically dipping frame into a liquid with a surfactant.

Other Components

Referring back to FIG. 1, the system may also comprise a camera 60 (which includes any known image sensor) and a light source 65, and may also contain a processor 80 that is configured to control the camera 60, the light source 65, the pump 20, and/or the flow control unit 50.

Figure 6:
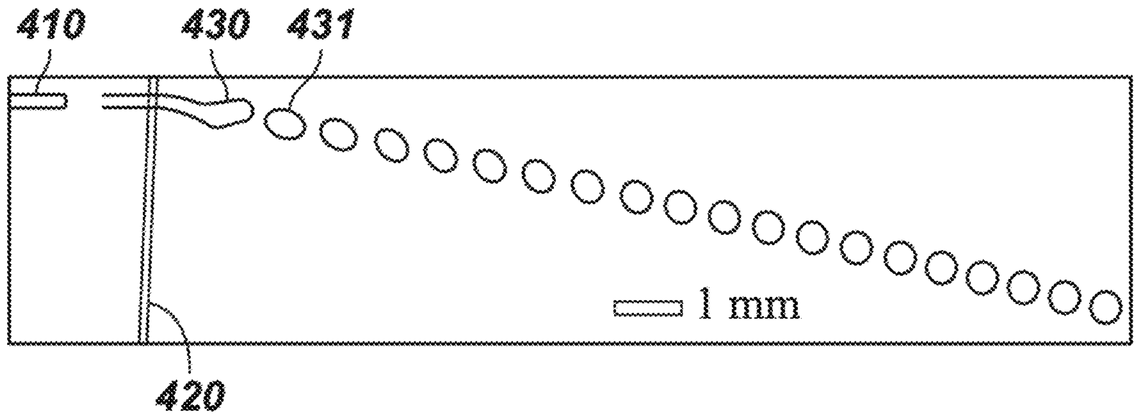
FIG. 6 is a depiction of the process of liquid micro-shells production, including a nozzle (black horizontal line in upper left, about 1 mm long in practice) directing air towards a falling film (dark vertical line about 2 cm from the left edge in the image, about 1 mm away from the end of the nozzle in practice) forming a steady stream of monodisperse aerosol bubbles (dark spheres, generally forming within 2 cm of the falling film, about 2 mm in practice).

The camera 60, if used, will preferably be directed to capture side/cross-sectional images of the intermediate portion 33 of the falling film 30, which during operations can result in images similar to the depiction shown in FIG. 6. There, the nozzle 410 can be seen directing a gas at falling film 420. A string of formed monodisperse bubbles 431 can be seen, as well as a bubble in the process of being formed 430.

In some embodiments, the light source 65 can be used to illuminate the falling film and/or aerosol bubbles, allowing the camera to capture better pictures of the film and/or aerosol bubbles.

In some embodiments, the light source 65 can be producing electromagnetic waves of an ultraviolet spectrum and a photopolymer is supplied with the solution 21 to form the thin film 30, so that when the ultraviolet light 65 is directed onto the generated liquid micro-shells, the light initiates and propagates a photopolymerization reaction for a photopolymer contained in the walls of the generated micro-shells.

In some embodiments, the processor 80 processes images captured by the camera 60 and makes determinations as to the thickness 37 of the falling film 30, and causes the pump 20 to adjust the rate the liquid is pumped to the falling film 30 to adjust the thickness of the film to reach a desired target or target range.

In some embodiments, the processor 80 processes images captured by the camera 60, by identifying aerosol bubbles 70, 71, 72, 73 and making at least one determination as to the throughput of the aerosol bubbles. The processor 70 then can cause the flow control unit 50 to adjust the flow rates of the gas one or more of the nozzles 40, 44, in order to adjust the throughput of the aerosol bubbles to a desired target or target range. If no aerosol bubbles are detected, this may include identifying if the nozzle is operating in the first regime 110 or the third regime 130, and adjusting the flow rate up or down, respectively, until aerosol bubbles appear.

Example

In an experimental setup, soap solutions were used made by mixing a dishwashing liquid (surfactant), water and glycerol, that allowed production of falling soap films with thickness 2-15 μm, length 1.3 m and width 8 cm capable of living for tens of minutes. Standard blunt hypodermic needles with internal diameters 90-1000 μm were used as nozzles to provide an air jet from supplied air pressurized within the range 10-1000 mbar. The air jet out of the nozzle was blown perpendicularly to the film. Gradually increasing the air pressure before the nozzle, the three main regimes of gas jet-film interaction were observed, as shown in FIG. 4 (the first regime 110, second region 120, and third regime 130). In the first region 110, formation of a cavity in the thin film was observed. In the second region 120, production of aerosol bubbles was observed. In the third region 130, a regime of thin film bursting was found. In addition, for the second region 120, bubble production was found to have two sub-regimes: 1) Unstable/polydisperse bubbling, when the air pressure before the nozzle was approximately up to 10-15% higher than the boundary pressure of the region 110; 2) For the nozzle pressures above that sub-regime and up to the nozzle pressures corresponding to the lower boundary of the region 130, stable production of uniform-diameter aerosol bubbles was found with a) bubble diameter controlled by a nozzle inner diameter, and b) bubble production rate (throughput) controlled by air pressure supplied to a nozzle of given inner diameter. It was found that an optimal nozzle pressure for the stable production of uniform-diameter aerosol bubbles can be established as approximately half of the sum of the nozzle pressures corresponding to the upper pressure boundary of the region 110 and lower pressure boundary of the region 130.

Thus, a preferred method for generating aerosols of particles having liquid shell of micron-scale thickness surrounding a gas core (i.e., aerosol bubbles). The process generally involves providing a system as described above, creating a falling film from a liquid containing a dissolved surfactant, the falling film having a thickness of less than 20 μm, then generating a plurality of aerosol bubbles by providing a gas at a pressure of between 10 mbar and 1500 mbar to a nozzle configured to direct the gas through the falling film. A skilled artisan will recognize that some adjustment for the gas flow rate and/or thickness of the film may need to be taken into account in order to stay within the second regime 120 and form a stream of monodisperse aerosol bubbles. In some embodiments, the liquid for the falling film contains the dissolved surfactant and at least one additional material that is suspended or dissolved in the liquid, as described above.

The method may also involve, for example, drying and/or solidifying the aerosol bubbles, generating a solid foam material from the plurality of aerosol bubbles, and collecting the plurality of aerosol bubbles, such as in a container or on a surface.

Figure 7:
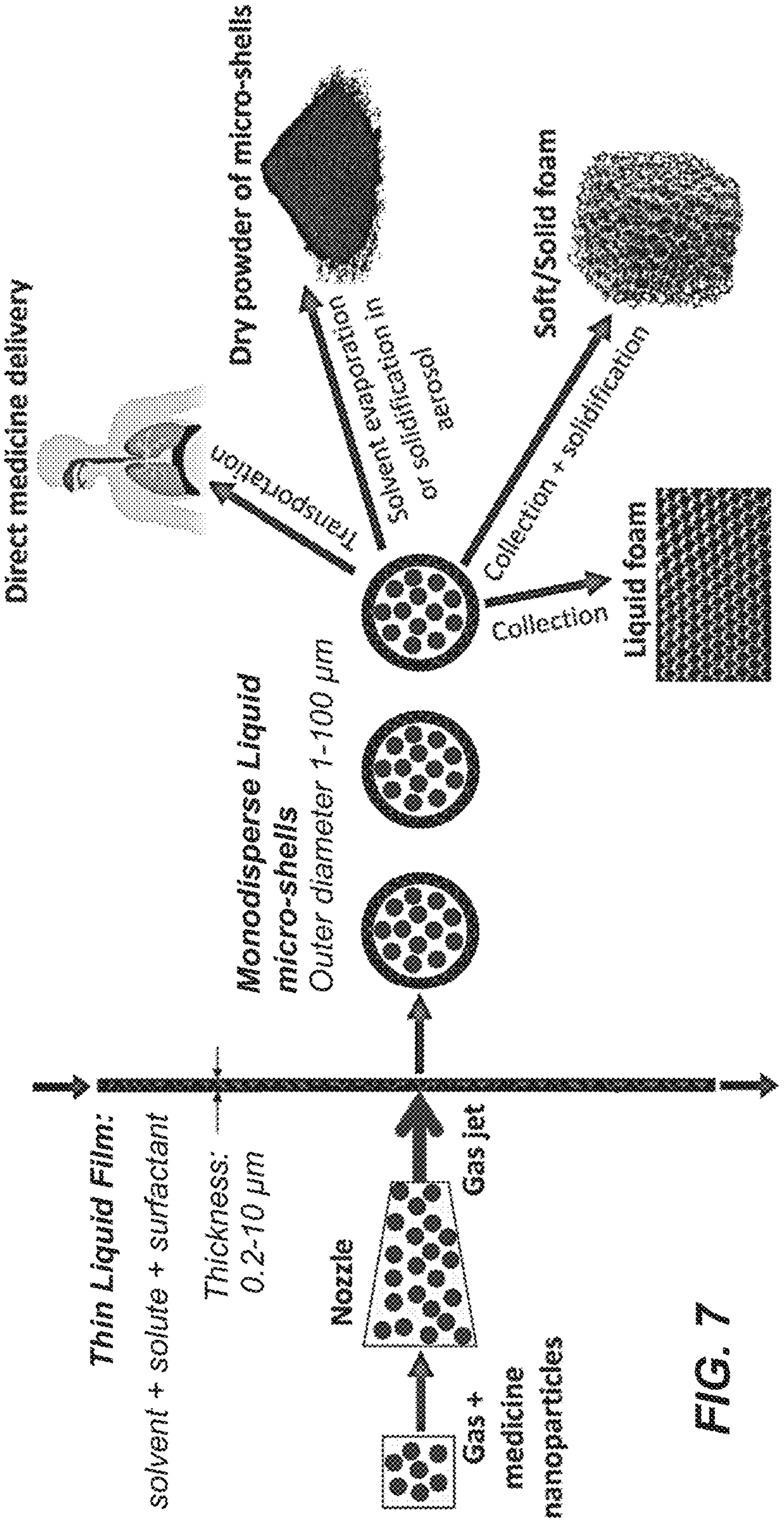
FIG. 7 is a schematic diagram illustrating various embodiments for the production of high-throughput monodisperse aerosols of micro-shell particles and fine foams for health applications.

Referring to FIG. 7, embodiments of such method can be visualized. As seen in FIG. 7, a gas containing suspended medicinal nanoparticles is provided to a nozzle, which directs the gas jet towards a thin liquid film. Here, the thin liquid film is shown as being 0.2-10 μm thick, and comprising a solvent, solute, and surfactant. This results in the formation of monodisperse liquid micro-shells (e.g., aerosol bubbles) that encapsulate the medicinal nanoparticles. These aerosol bubbles are shown as having a substantially uniform outer diameter of 1-100 μm. At that point, four different options are illustrated, depending on the desired result.

The first option involves the direct delivery of the medicine. That is, the aerosol bubbles are transported to a patient, who then can have the medicine administered (via, e.g., inhalation). In one embodiment, the aerosol bubbles are directed through tubes to, e.g., a mask, which allows the medicine to be inhaled directly.

The second option is to form a dry powder of micro-shells. This option will generally involve evaporation of the solvent and/or solidification of the liquid micro-shell in the aerosol via known techniques.

The third option is to create a soft or solid foam, which involves the collection of the liquid micro-shells and optionally directing the collected liquid micro-shells to form a particular shape, and then solidifying them.

The fourth option is to generate a liquid foam material, which involves collecting the liquid micro-shells, and optionally directing the collected liquid micro-shells to form a particular shape.

In some embodiments, the falling film is created by pumping a liquid, at a controlled rate, to the top portion of the falling film. In some embodiments, images of the aerosol bubbles being produced are captured by a camera. In some embodiments, a container or funnel is used to capture liquid leaving the bottom of the falling film. In some embodiments, the liquid forming the falling film has a viscosity less than 100 mPa·s at 25° C. In some embodiments, the liquid forming the falling film contains an additional material that is suspended or dissolved in the liquid, such as an active pharmaceutical ingredient (API). In some embodiments, the gas being provided contains suspended micron- or nano-sized particles or droplets, such as an API. In some embodiments, the nozzle has an inner diameter <1 mm, or <1 μm. In some embodiments, a bank of nozzles is used to blow the gas, in parallel, on the falling film. In some embodiments, a carrier gas is supplied to dilute or direct the flow of the generated bubble aerosol. In some embodiments, the aerosol bubbles are monodisperse bubbles, and/or have an average diameter less than 1 mm and/or a maximum diameter less than 1 mm, and/or a wall thickness of less than 5 μm. In some embodiments, the film is created by either pumping liquid comprising a surfactant to the top of a vertically-oriented frame and allowing the liquid to create the film as it falls, or periodically dipping frame into liquid with surfactant.

The disclosed systems and methods can be used, inter alia, as a process technology for producing a product. The disclosed approach may be employed in the production of aerosols with bubble particles carrying a medicine which can be directed into human airways. Another possibility is the collection of generated aerosol bubbles on a plate or in a vessel to make a foam which can be further used for healthcare applications (e.g., medical diagnostics). Additionally, the disclosed approach may be employed for the drying/solidification of generated aerosol bubble particles and would make possible manufacturing in this way of solid spherical shells for pharmaceutical/material/cosmetics/food applications. Additionally, the disclosed approach may be employed for the drying/solidifying of a foam produced from the collected aerosol bubble particles to manufacture in this way solid foam materials.

Those skilled in the art will recognize, or be able to ascertain using no more than routine experimentation, many equivalents to the specific embodiments of the invention described herein. Such equivalents are intended to be encompassed by the following claims.

What is claimed is:

1. A system for generating aerosols of particles having a liquid shell of micron-scale thickness surrounding a gas core, comprising:
- a frame configured to create a falling film of liquid having a thickness less than 20 μm, the falling film having a top portion, a bottom portion, and an intermediate portion;
- a nozzle configured to direct a gas towards the intermediate portion of the falling film; and
- a controller adapted to control a pressure of the gas provided to the nozzle.

2. The system according to claim 1, further comprising a pump configured to provide a liquid to the top portion of the falling film at a controlled rate.

3. The system according to claim 1, further comprising a camera directed at the intermediate portion.

4. The system according to claim 1, further comprising a container to collect a liquid from the bottom portion of the falling film.

5. The system according to claim 1, wherein a liquid used to create the falling film has a viscosity less than 100 mPa·s at 25° C.

6. The system according to claim 1, wherein a liquid used to create the falling film contains an additional material that is suspended or dissolved in the liquid.

7. The system according to claim 6, wherein the additional material comprises an active pharmaceutical ingredient.

8. The system according to claim 1, wherein the gas contains suspended micron- or nano-sized particles or droplets.

9. The system according to claim 8, wherein the suspended particles or droplets comprise an active pharmaceutical ingredient.

10. The system according to claim 1, wherein
- the nozzle has an inner diameter of less than 1 mm;
- the nozzle is one of a bank of nozzles blowing in parallel on the falling film;
- a carrier gas is supplied to dilute or direct a flow of the generated aerosols;
- the system is configured to generate monodisperse aerosols;
- the system is configured to generate bubbles in aerosols having an average diameter less than 1 mm;
- the system is configured to generate bubbles in aerosols having a maximum diameter less than 1 mm;

or
- the system is configured to generate bubbles having a wall thickness of less than 5 μm.

11. The system according to claim 1, further comprising a second falling film.

12. The system according to claim 11, wherein the system is configured such that an aerosol bubble formed from the falling film is configured to pass through the second falling film.

13. The system according to claim 11, wherein the system is configured such that the falling film creates a first shell and the second falling film creates a second shell.

14. A method for generating aerosols of particles having a liquid shell of micron-scale thickness surrounding a gas core, comprising:
- a. creating a falling film from a liquid containing a dissolved surfactant, the falling film having a thickness of less than 20 μm; and
- b. generating a plurality of aerosol bubbles by providing a gas to a nozzle configured to direct the gas through the falling film.

15. The method according to claim 14, wherein the liquid for the falling film contains the dissolved surfactant and at least one additional material that is suspended or dissolved in the liquid.

16. The method according to claim 14, further comprising drying the aerosol bubbles, solidifying the aerosol bubbles, or a combination thereof.

17. The method according to claim 14, wherein the provided gas contains micro or nanoparticles suspended in the gas, which are then encapsulated into the aerosol bubbles.

18. The method according to claim 14, further comprising collecting the plurality of aerosol bubbles.

19. The method according to claim 14, further comprising generating a liquid foam material from the plurality of aerosol bubbles, or generating a solid foam material from the plurality of aerosol bubbles.

20. The method according to claim 14, wherein the falling film is created by at least one of:
- a. pumping liquid comprising a surfactant to a top of a vertically-oriented frame and allowing the liquid to create the falling film as it falls, or
- b. periodically dipping a frame into a liquid containing a small amount of surfactant.

* * * * *